Feb. 25, 1958     E. H. ENSINGER     2,824,660
PORTABLE MATERIALS HANDLING APPARATUS
Filed Aug. 30, 1954     3 Sheets-Sheet 1
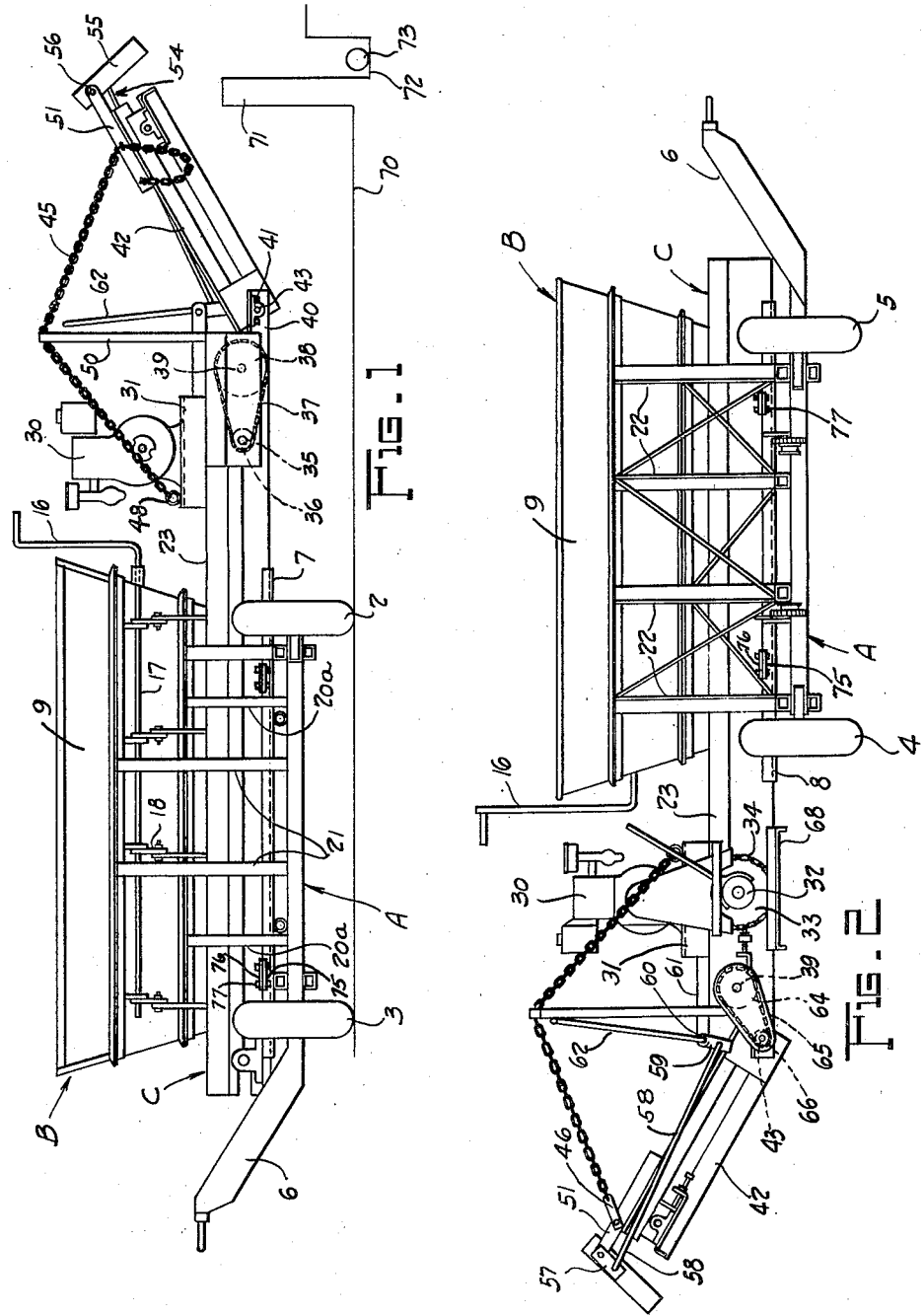
INVENTOR.
E. H. ENSINGER
BY Robb & Robb
attorneys

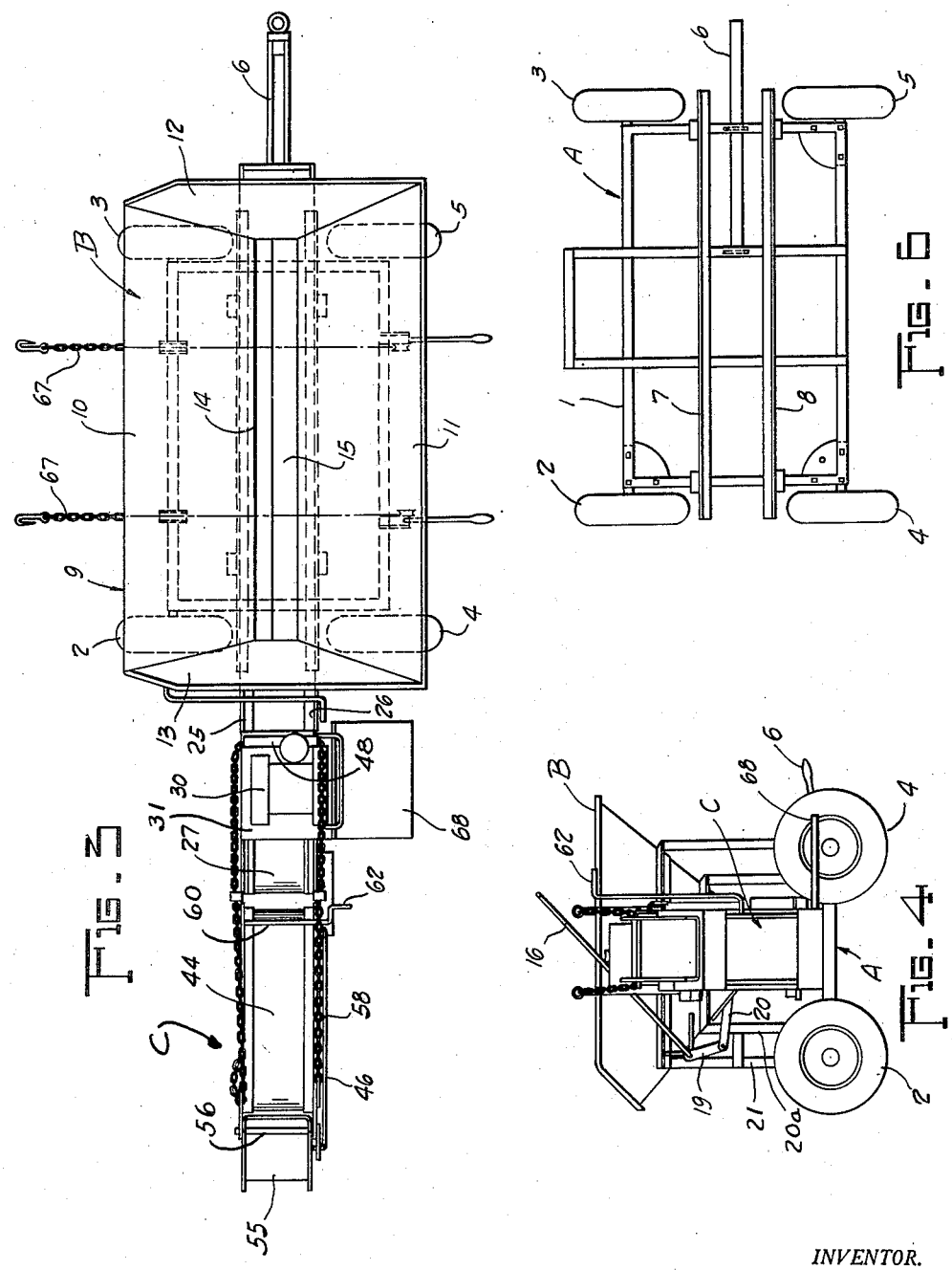

Feb. 25, 1958 E. H. ENSINGER 2,824,660
PORTABLE MATERIALS HANDLING APPARATUS
Filed Aug. 30, 1954 3 Sheets-Sheet 3
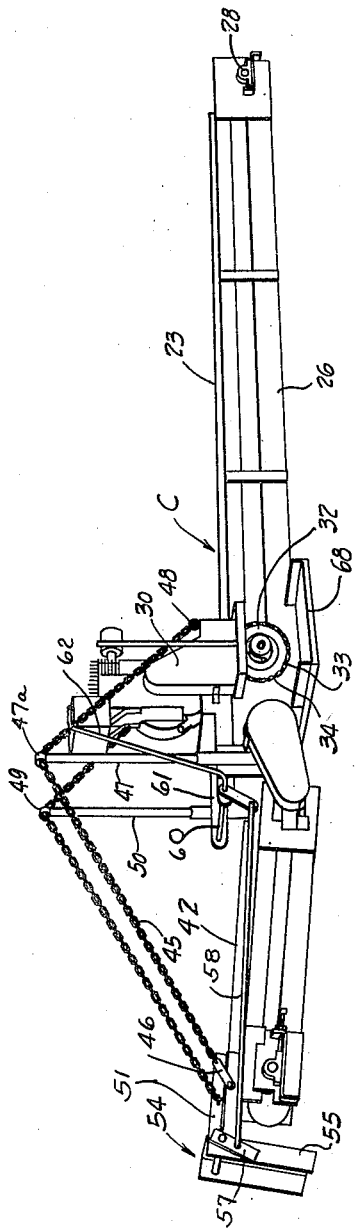
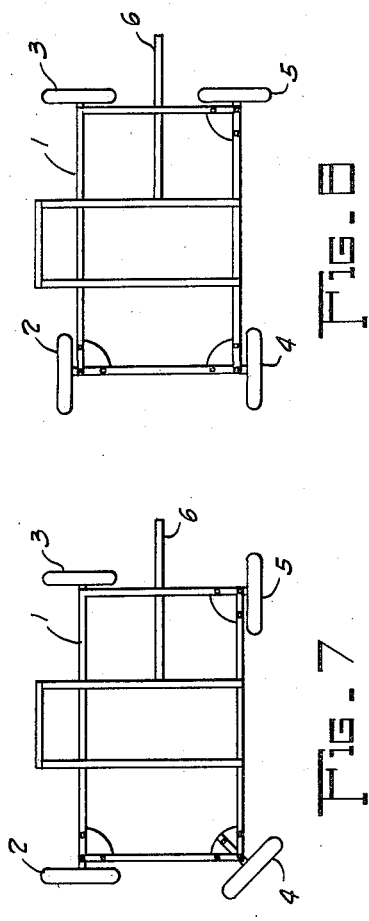
INVENTOR.
E. H. ENSINGER
BY Robb & Robb
attorneys

United States Patent Office 2,824,660
Patented Feb. 25, 1958

2,824,660

PORTABLE MATERIALS HANDLING APPARATUS

Earl H. Ensinger, Cleveland, Ohio

Application August 30, 1954, Serial No. 452,915

1 Claim. (Cl. 214—522)

This invention relates to portable material handling apparatus and primarily to a vehicle adapted to be towed behind a truck or otherwise propelled, to thereby deposit material at a plurality of selected locations.

A primary object of the invention is to provide a wheel supported chassis having a hopper capable of receiving a quantity of material such as sand, gravel, or the like, and transfer such material to a laterally extending conveyor unit whereby said material may be directed in a controlled manner to the side of a road or the like.

A further object of the invention is to provide in apparatus of the class described, a novel conveyor unit which is detachably mounted on the chassis and is capable of delivering material deposited thereon to widely selected locations under the control of an operator.

A still further object of the invention is to provide a novel conveyor unit comprised of a first substantially horizontal conveyor and a second detachable conveyor pivotally supported thereon adjacent the discharge end of said first conveyor, which second conveyor may be adjusted at its discharge end to a wide range of positions, discharge of material being controlled for deposit in selected positions.

Yet another object of the invention is to provide apparatus for handling material which comprises a detachable conveyor unit, which in turn includes two conveyor devices, one of which is adjustable for discharge of material in selected positions, there being means for control of such discharge and common power means for driving the respective devices.

Another object of the invention is to provide an apparatus for handling material, comprising a detachable conveyor unit comprised of a pair of endless belt conveyors, one of which is normally substantially fixed in horizontal position for travel and the other of which is pivotally mounted at the discharge end of the said first conveyor and contiguous thereto whereby material may be delivered to the second conveyor, to thereafter be moved into a plurality of positions, the movement of the material being regulated as to its height of delivery, and the position to which the material is eventually delivered by said second conveyor being controlled laterally by suitable means provided therefor.

Other and further objects of the invention will be understood from a consideration of the specification appended hereto and shown in the drawings wherein:

Figure 1 is a front view in elevation of the apparatus of this invention showing the wheel supported chassis frame, the hopper thereabove, and the conveyor unit in position thereon, the said apparatus being shown in the position wherein it is adaptable for carrying out its material delivery function.

Figure 2 is a view in rear elevation, similar to Figure 1 showing the arrangement of the various parts.

Figure 3 is a top plan view of the apparatus showing the relationship of the hopper, the chassis, and the conveyor unit supported thereby.

Figure 4 is an end view looking toward the left in Figure 1, showing the relationship of the respective parts.

Figure 5 is a perspective view showing the conveyor unit removed from the apparatus and including the two conveyor devices comprising the same.

Figure 6 is a top plan view showing the chassis with all of the superstructure and parts removed therefrom illustrating the manner of support of the conveyor unit thereon.

Figures 7 and 8 illustrate the chassis and supporting wheels in different positions for movement and support of the chassis.

Referring initially to Figures 1, 5, and 6, the apparatus of this invention is shown as comprising a vehicle which includes the chassis generally designated A, the hopper unit supported thereabove generally designated B, and the conveyor unit supported on the chassis and beneath the hopper unit and designated generally C.

Referring particularly to Figure 6, the chassis unit A is shown as being comprised of a substantially rectangular frame 1 having the wheels 2 and 3 at the forward side of the chassis frame 1, and the wheels 4 and 5 at the rear side of the chassis frame. It might be noted at this point that the chassis frame is so arranged with its respective wheels whereby the wheels 2, 4, and 5 are susceptible of being moved to positions at right angles to those shown in the Figure 6 disclosure, whereby the vehicle as a whole may be turned or positioned, and move into a relation whereby the unit as a whole may be towed by the tongue 6 at one end by a suitable vehicle, in a direction at right angles to its normal direction of movement when it is carrying out its material handling function. This latter arrangement is of particular advantage in view of the width of the vehicle when in assembled relation as will be readily understood.

In addition to the rectangular chassis frame 1, the said frame is equipped with a pair of parallel rail members 7 and 8, which are suitably fixed to the frame 1 and adapted to support thereon the conveyor unit shown by itself in Figure 5. The conveyor unit C is adapted to be slideably positioned on the rails 7 and 8 so as to assume the relationship more particularly shown in Figures 1 and 2, beneath the hopper unit B.

The hopper unit B includes the hopper 9, having the inwardly sloped sides 10 and 11, and the correspondingly inwardly sloped ends 12 and 13. At the bottom of the hopper 9, the same is equipped with a suitable opening 14, the same being a relatively long and narrow opening as will be readily understood and positioned above the conveyor unit C for purposes to be more fully explained hereinafter.

The hopper 9 may preferably be equipped with a suitable gate designated 15, which gate is intended to regulate the width of the opening as by means of a handle 16, shown in Figure 1, which handle 16 is in turn connected to a shaft 17 extending along the hopper and having suitable connections such as 18 comprising a link 19 and an arm 20 more clearly shown in Figure 4, which arm in each case is connected to the gate 15 to vary its attitude with respect to the opening 14 previously referred to.

It will be readily understood that the hopper 9 is supported on the chassis frame as by means of suitable supporting members such as illustrated in Figure 1 and denoted 20a and 21 at the forward side of the hopper and members 22 at the rear of the hopper, all the said members extending upwardly from the frame and being suitably welded or otherwise secured thereto and likewise to the hopper.

As will be apparent, the hopper 9 is thereby supported above the chassis unit A so as to be spaced sufficiently far therefrom to permit the conveyor unit C, to be described more particularly hereinafter, to be moved into position along the rails 7 and 8 to assume the position shown in Figure 1, to thereby receive materials which are delivered to the hopper unit B.

Describing the conveyor unit C more particularly, it will be seen that this unit comprises a first conveyor generally designated 23 and a second conveyor device designated 42. These respective devices, and particularly describing the device 23, include suitable side frame elements indicated at 25 and 26 in Figure 3, the element 26 being also shown in Figure 5, and comprising a suitable framework with the necessary elements to secure the respective sides together to thereby support therewithin, an endless belt designated 27 in Figure 3.

The endless belt 27 may be supported for movement in any preferred manner as is well known, as by means of the pillow blocks such as 28 indicated in Figure 5, suitable rolls of sufficient diameter being mounted on the usual shafts at opposite ends of the device 23 whereby the endless belt carried thereby will move therearound. There are of course the usually furnished additional supports for the belt between the respective sides, the same not being shown but being well known.

In order to drive the endless belt 27, a suitable power unit designated 30 is provided at one end of the device 23 and mounted thereabove on a suitable support 31, the support being fastened to the respective sides frames 25 and 26 in any preferred manner. The power unit 30 is equipped with a suitable transmission device controlled by a clutch 32, the drive of the power device or engine 30 being delivered thereto around a sprocket 33 by means of a chain 34. The clutch 32 is in turn supported on a transverse shaft 35, shown in Figure 1, to deliver the power of the engine to a sprocket 36 at the opposite side of the frame of the device 23, and thence to a chain 37 and a further sprocket 38 mounted on the shaft 39, which shaft 39 likewise supports the roll over which the endless belt 27 moves.

It will thus be seen that up to this point the conveyor device 23 is of substantially standard construction, including the necessary elements to support an endless belt therein, whereby materials may be moved thereby.

At the discharge end of the conveyor device 23, the said device is equipped with frame extension members such as 40, which in turn support as by means of suitable pillow blocks 41, a second conveyor device 42. The conveyor device 42 is similar in construction to the device 23, but as will be apparent of lesser length, the shaft on which one of the rolls in the device 42 is supported being designated at 43, that shaft being carried in the pillow blocks 41 previously mentioned.

The device 42 is thereby pivotally supported, and in a manner so as to be slightly below the plane of the belt 27 whereby material delivered from the belt 27 will be received on a belt 44 shown in Figure 3, and included in the device 42.

The device 42 being pivotally supported at 43, is further supported for adjustability at its discharge end by means of a chain 45, which chain 45 is fixed at one end 46 as shown in Figure 3, thence passes upwardly and over a support 47 extending upwardly above the conveyor device 23, and through an eye 47a at the upper end thereof, thence downwardly into and through a tubular member 48 likewise fixed to the framework of the device 23, and thence laterally across the device 23 and upwardly and forwardly through an eye 49 on a further support 50 similar to the support 47, and hence outwardly to a member 51 fixed to the framework of the device 42 and through a suitable opening therein whereby the chain may be manipulated so as to position the same in such opening and be locked in position therein. It will therefore be apparent that by raising the outer end of the device 42, and adjusting the chains through their respective eyes 47a and 49 and the tube 48, said device may be positioned in a pivotal manner and maintained in such position.

At the discharge end of the device 42 a flow control means 54 is provided, which means comprises a gate member 55 pivotally mounted on the arms 51 at 56, the part 56 being a cross shaft and at its end as shown in Figure 2 being provided with a lever 57. The lever 57 is in turn connected to a long link 58 extending toward the opposite end of the device 42, and engaged with a further link 59, which link 59 is carried on a shaft 60, the shaft 60 being supported in suitable members 61 at the upper part of the discharge end of the conveyor device 23. The shaft 60 is in turn equipped with an upstanding lever 62 whereby manipulation of the lever 62 will impart suitable pivotal movement of the gate member 55 as will be readily apparent.

In order to drive the conveyor belt 44 of the conveyor device 42 now being described, the shaft 39 illustrated in Figure 1 is equipped at its opposite end with a suitable sprocket 64, which sprocket in turn engages a chain 65 and a smaller sprocket 66 mounted on the shaft 43 as shown in Figure 2, the shaft 43 as mentioned being the shaft upon which the roll engaged with the conveyor belt 44 is supported.

It will thus be apparent that when the clutch 32 is engaged so as to transfer the drive from the motor 30 to the conveyor belt 27, corresponding drive movement will be delivered to the conveyor belt 44 by the means just above described, to thereby simultaneously operate the respective conveyor belts.

In order to facilitate the movement of the vehicle as a whole in its material handling operation, suitable means such as 67 in the form of chains are provided, which means may be connected to a truck, to thus cause the vehicle as a whole to move in the direction indicated in Figure 3 as being a proper direction by reason of the position of the wheels 2 to 5 inclusive shown therein. For this purpose usually a dumptruck is availed of, whereby material carried by the dumptruck may be deposited in the hopper 9, such material commonly being sand or gravel.

In operation of the apparatus, it will be assumed that the chains 67 are connected to a suitable dumptruck and that material is in the dumptruck ready to be deposited in the hopper 9, along the lines illustrated in Figure 3. Therefore the apparatus will be towed and the material from the truck dumped into the hopper 9, for deposit under the control of the operator who in this instance will be standing on a suitable platform 68 carried by the frame of the conveyor device 23.

The operator will have under his control the motor 30 as by means of the clutch 32 provided therefor, whereby the endless belts 27 and 44 are caused to move.

For illustrative purposes as seen in Figure 1, it will be assumed that the vehicle is moving over a sub-grade such as indicated at 70, and it is desired to deposit sand at the outer side of a curb 71, in the usual drainage trench 72 and around the drain pipe such as 73 shown. The operator will therefore cause the clutch to be engaged, thereby imparting movement to the respective endless belt 27 and 44, the gate 15 having been sufficiently opened so that material will pass through the opening 14 onto the conveyor belt 27. The material will therefore move outwardly so to speak along the said belt and in turn be deposited upon the belt 44 contiguous with such end and thus transported upwardly toward the discharge end of such conveyor device 42. The gate 55 may be manipulated by the lever 62 provided, so that as the material passes over the discharge end of the conveyor device 42, it will be deposited in the trench in which the drain pipe 43 is positioned. By manipulating the gate in a suitable manner, the operator may cause more or less material to be deposited, and by speeding up or slowing down the motor will likewise obtain control of the quantity of the material to be deposited.

It will be understood that the gate may be moved in a counter-clockwise position from that shown in Figure 1 and the motor speeded up to thereby cause the material to move in greater quantity and to a greater distance outwardly or correspondingly the belts may be slowed down and the gate moved in a clockwise direction to change the quantity or position at which the material is to be deposited.

It should be pointed out that the very novel advantage derived from the manner of mounting of the respective conveyor devices 23 and 42, provides for a very wide range of movement to thereby deposit the materials carried in a wide selection of positions, and particularly where the material is to be deposited over high curbs for example or in other relatively inaccessible positions not normally easy to cause materials to be deposited in. By raising or lowering the discharge end of the conveyor device 42 this wide range of delivery of materials is facilitated, and a substantial increase in the amount of material and rapidity of deposit is accomplished. This is particularly true in view of the fact that normally such back filling operations as above described have been accomplished by hand labor and even where a conveyor could be used, in some circumstances, under other conditions the improvements provided by the combination conveyor unit of this invention provides greater flexibility and ease of handling such material.

The conveyor unit C is detachably associated with the chassis A, so that if desired, the complete conveyor unit C may be entirely removed from the chassis A for independent use of the conveyor unit C. For the purpose of retaining the conveyor unit C in its operative position as a part of the combination machine as shown in Figures 1, 2, and 3, alignable bolting plates 76 are provided on the frame of the conveyor device 23 and on the frame of the chassis A at 75 through which bolts 77 may be passed for locking the conveyor unit C in such operative condition.

The conveyor device 42 is also detachably connected to the conveyor device 23, so that if desired, the conveyor device 42 can be removed leaving the conveyor device 23 in operative association with the chassis A. In order to remove the conveyor device 42 from operative association with the conveyor device 23, it is only necessary to remove the bolts which secure the pillow blocks 41 to the frame extension 40, disconnect the link 58, and disengage the sprocket 65.

It will be evident that the apparatus herein described is quite versatile since, in addition to being employed in the combination principally shown in Figures 1, 2, and 3, the conveyor unit C removed from the chassis A, as shown in Figure 5, may be employed independently of the hopper and chassis units A and B. Also the apparatus of Figures 1, 2, and 3 may be usefully employed for certain purposes when the conveyor device 42 has been disassociated from the conveyor device 23.

I claim:

In a portable material handling apparatus of the class described, in combination, a wheeled chassis unit, means for connecting said unit to a vehicle to be towed thereby, a hopper unit mounted on said chassis unit comprising a hopper having an opening for discharge of material transversely from said hopper, a conveyor unit slidably transversely detachably mounted on said chassis unit, removable as a unit whilst said hopper unit and chassis unit remain connected, said conveyor unit comprising a frame, a first endless belt conveyor device mounted transversely on the chassis arranged to receive material discharged from said hopper, said conveyor unit also including a second endless belt conveyor device pivotally mounted on the frame of said first device at the end thereof in contiguous relation to the discharge end of said first device and swingably movable relative thereto, said second device thereby constituting a continuing extension of the first device, swingable means at the outer end of the second device to control direction of discharge of material therefrom, and control means for said swingable means mounted on said frame.

References Cited in the file of this patent

UNITED STATES PATENTS

| | | |
|---|---|---|
| 710,611 | Ray | Oct. 7, 1902 |
| 923,064 | Morenus | May 25, 1909 |
| 1,353,201 | Williams | Sept. 21, 1920 |
| 1,515,328 | Barkmann et al. | Nov. 11, 1924 |
| 1,759,003 | Davidson | May 20, 1930 |
| 1,809,796 | Beardsley et al. | June 9, 1931 |
| 2,057,280 | Spiegel | Oct. 13, 1936 |
| 2,275,799 | Oklejas | Mar. 10, 1942 |
| 2,347,522 | Stinnett | Apr. 25, 1944 |
| 2,422,268 | Symonds | June 17, 1947 |
| 2,431,000 | Step | Nov. 18, 1947 |
| 2,466,923 | Woodard | Apr. 12, 1949 |
| 2,490,241 | Smith et al. | Dec. 6, 1949 |
| 2,676,002 | Wolfe | Apr. 20, 1954 |